UNITED STATES PATENT OFFICE.

JAMES ALCORN, JR., OF BOSTON, MASSACHUSETTS, ASSIGNOR TO JOHN M. WHITE, OF SAME PLACE.

IMPROVEMENT IN CEMENTS FOR WATER-PROOFING JOINTS, &c.

Specification forming part of Letters Patent No. 149,022, dated March 31, 1874; application filed March 2, 1874.

*To all whom it may concern:*

Be it known that I, JAMES ALCORN, Jr., of Boston, in the county of Suffolk and State of Massachusetts, have invented a new and useful Compound or Cement for Luting the Joints of Steam-Pipes, &c.; and do hereby declare the following to be a full and accurate description thereof.

My invention, although especially designed for luting steam-joints, is equally applicable to the luting of other metallic joints or connections.

I am aware that various compounds or cements have been employed for the purpose of rendering the joints of steam-pipes tight, but more or less objections exist to all that have come within my knowledge. Owing to the wide range of expansion and contraction of the metal of the pipes under the influence of heat and cold, the ordinary cementing compounds soon become cracked or broken, so as to cause the joint or part to which it is applied to leak.

The object of my invention is to provide a cement which, while possessing all the good qualities of those ordinarily used for this purpose, shall be free of their defects. This I effect by a combination of ingredients, which when compounded has its ratio of expansion and contraction coincident, or about so, with that of the iron of which the pipes are composed. The ingredients composing my cement are ground lead, preferably white, manganese, litharge, and boiled linseed-oil. The proportions of the same are as follows: Four pounds of white lead, two pounds of manganese, one pound of litharge, and one-half pint of boiled linseed-oil, or a sufficient quantity thereof to render the compound when mixed of the consistency of ordinary putty. In compounding the same, I put the lead, manganese, and litharge into any suitable vessel and stir the same until they have become thoroughly intermixed, when I pour in the oil, or a sufficient quantity thereof, to render the compound of the consistency desired, and stir or manipulate until the whole is reduced to a homogeneous mass, when it is ready for use.

What I claim as my invention is—

The above-described compound or cement, consisting of the ingredients and in the proportions substantially as and for the purpose specified.

JAMES·ALCORN, JR.

Witnesses:
F. P. HALE,
F. C. HALE.